(12) United States Patent
Kim et al.

(10) Patent No.: US 8,610,711 B2
(45) Date of Patent: Dec. 17, 2013

(54) DEVICE FOR THREE-DIMENSIONAL IMAGE DISPLAY USING VIEWING ZONE ENLARGEMENT

(75) Inventors: Sung Kyu Kim, Seoul (KR); Jinwook Kim, Seoul (KR); Seon Kyu Yoon, Jeju-si (KR)

(73) Assignee: Korea Institute of Science and Technology, Seoul (KR)

( * ) Notice: Subject to any disclaimer, the term of this patent is extended or adjusted under 35 U.S.C. 154(b) by 270 days.

(21) Appl. No.: 13/111,906

(22) Filed: May 19, 2011

(65) Prior Publication Data

US 2011/0285700 A1 Nov. 24, 2011

(30) Foreign Application Priority Data

May 20, 2010 (KR) ........................ 10-2010-0047636

(51) Int. Cl.
*G06T 15/00* (2011.01)
(52) U.S. Cl.
USPC .......................................................... 345/419
(58) Field of Classification Search
USPC .......................................................... 345/419
See application file for complete search history.

(56) References Cited

U.S. PATENT DOCUMENTS

| | | | | |
|---|---|---|---|---|
| 5,777,720 | A * | 7/1998 | Shapiro et al. | 351/237 |
| 5,991,073 | A * | 11/1999 | Woodgate et al. | 359/462 |
| 6,307,585 | B1 * | 10/2001 | Hentschke | 348/51 |
| 2003/0179364 | A1 * | 9/2003 | Steenblik et al. | 356/71 |
| 2005/0105179 | A1 * | 5/2005 | Taira et al. | 359/463 |
| 2008/0068329 | A1 * | 3/2008 | Shestak et al. | 345/102 |
| 2008/0180443 | A1 * | 7/2008 | Mihara | 345/427 |
| 2008/0309663 | A1 * | 12/2008 | Fukushima et al. | 345/419 |

OTHER PUBLICATIONS

G. Woodgate, D. Ezra, J. Harrold, N. Holliman, G. Jones, and R. Moseley, "Observer tracking autostereoscopic 3D display systems," in Proc. SPIE, S. S. Fisher, J. O. Merritt, and M. T. Bolas, Eds., 1997, vol. 3012, pp. 187-198.*
G. J. Woodgate, D. Ezra, J. Harrold, N. S. Holliman, G. R. Jones, and R. R. Moseley, "Autostereoscopic 3D display systems with observer tracking," Signal Processing: Image Commun., vol. 14, pp. 131-145, 1998.*
A. Boev, A. Gotchev, K. Egiazarian, "Crosstalk measurement methodology for autostereoscopic screens" in 3DTV Conference, Kos Island, 2007.*
A. Boev, M. Georgiev, A. Gotchev, N. Daskalov and K. Egiazarian "Optimized visualization of stereo images on an OMAP platform with integrated parallax barrier auto-stereoscopic display", in Proc. of 17th European Signal Conference Eusipco 2009, Glasgow, Scotland, Aug. 2009.*

* cited by examiner

*Primary Examiner* — Ryan R Yang
*Assistant Examiner* — Jin Ge
(74) *Attorney, Agent, or Firm* — NSIP Law

(57) ABSTRACT

The present invention relates to a autostereoscopic image display device capable of observing a natural three-dimensional image without crosstalk or pseudo-stereoscopic zone between optimal viewpoints and without using special glasses. The three-dimensional image display device of the present invention includes: a display panel configured to display image information of at least two viewpoints; an optical substrate that is separately disposed from the display panel at a predetermined distance, the optical substrate being configured to form at least one intermediate viewing zone between left and right viewing zones included in base viewing zones corresponding to two viewpoints, which are observed when a position of an observer moves horizontally; and a control unit configured to provide the image information corresponding to the respective viewpoints at the base viewing zones and remove image information from the at least one intermediate viewing zone.

19 Claims, 10 Drawing Sheets

DEVICE FOR THREE-DIMENSIONAL IMAGE DISPLAY USING VIEWING ZONE ENLARGEMENT

CROSS-REFERENCE TO RELATED APPLICATIONS

The present application claims priority from Korean Patent Application No. 10-2010-0047636 filed on May 20, 2010, the entire subject matter of which is incorporated herein by reference.

TECHNICAL FIELD

The present invention generally relates to three-dimensional displays, and more particularly to a device for a three-dimensional image display that can minimize crosstalk and pseudo-stereoscopic vision by enlarging a viewing zone, controlling brightness and uniformity of some unit viewing zones, and dynamically optimizing the entire viewing zone.

BACKGROUND

A device for a three-dimensional image display is classified as a glasses type using special glasses and a non-glasses type without using any type of glasses (autostereoscopic display). The glasses type three-dimensional display device using the special glasses (e.g., polarized glasses) was commercialized prior to the autostereoscopic displays. However, the glasses type is disadvantageous since it required the use of special glasses. Thus, a portion of the autostereoscopic display device will gradually increase. On the other hand, the autostereoscopic display is disadvantageous since it is possible that a crosstalk between viewing zones and a pseudo-stereoscopic vision may occur. As such, in the non-glasses type, it is not easy to display natural three-dimensional images when an observer moves.

Referring to FIG. 1, the problems of conventional technologies are explained through a typical autostereoscopic display device using a parallax barrier in a three-dimensional image screen having two viewpoints. In a display panel DP, images for left and right eyes are displayed alternately by pixel units along a horizontal direction. A barrier substrate BS having barriers and apertures alternately is disposed apart from the display panel DP at a predetermined distance. The barrier substrate BS is designed considering a pixel size and an optimal viewing distance. The observer positioned at optimal observation points from the barrier substrate BS may observe images for the left eye through the left eye and images for the right eye through the right eye. In case of FIG. 1, when the left eye of the observer is positioned at A and the right eye is positioned at B, the observer may be positioned at the optimal observation point. The optimal observation points are repeatedly located apart from each other at a predetermined distance F along a horizontal direction. The optimal observation points are positioned apart from the display panel DP at a predetermined distance. For example, the predetermined distance F may be an average distance, i.e. 65 mm, between the left and right eyes of an adult. The typical autostereoscopic display apparatus may utilize a micro lenticular lens periodically arranged optical substrate instead of the barrier substrate BS.

The autostereoscopic display device is advantageous since there is no need to wear glasses to see three-dimensional images. However, it is disadvantageous since it is possible that the crosstalk between viewing zones and pseudo-stereoscopic vision may occur when the observer moves. Theoretically, when the images for the left eye are only projected into the left eye and the images for the right eye are only projected into the right eye, the observer can observe precise three-dimensional images. The crosstalk refers to an incomplete isolation of left and right eye channels so that one leaks into the other. That is, the images for the left and right eyes are mixed and projected into the left and right eyes. Referring to FIG. 1, when the observer's left eye moves from A to D, the observer's right eye moves from B to E. Then, the images for the left and right eyes are mixed and projected into the left and right eyes. The crosstalk may occur between the optimal observation points for the left and right eyes. The crosstalk is maximized at the intermediate of the optimal observation points for the left and right eyes.

At the three-dimensional image display device using binocular disparity means, a region of the pseudo-stereoscopic vision exists between main viewing zones and sub viewing zones. The region of the pseudo-stereoscopic vision represents a region that the images for the left eye are projected into the right eye and the images for the right eye are projected into the left eye. This is so that the observer may observe a distorted three-dimensional image instead of the precise three-dimensional image. Referring to FIG. 1, when the observer's left eye is positioned at B and the observer's right eye is positioned at C, the pseudo-stereoscopic vision may occur.

When designing the three-dimensional image display device, a distance between the left and right eyes is typically regarded as an average value, i.e., 65 mm, although the distance between the left and right eyes may differ from the average value and vary according to the observers. For example, the distance between the left and right eyes varies according to the classification of humans, e.g., children, men, women and the like. Furthermore, the distance between the left and right eyes varies according to each one included in the classification of the humans. If the left and right eyes get out of the optimal observation point, then the crosstalk may occur. In case that the distance between the left and right eyes is much different from the average value, no matter how well the left and right eyes are fitted into the optimal observation point, the crosstalk would occur. As such, the observer cannot observe the three-dimensional image precisely. The crosstalk and the pseudo-stereoscopic vision are problems of a conventional three-dimensional image display device using the parallax barrier and the lenticular lens. To solve the problems of the conventional three-dimensional image display device, a variety of methods that change a design of the optical substrate according to a characteristic of the three-dimensional image display device have been studied. However, such methods could not completely eliminate the crosstalk.

SUMMARY

An embodiment for dynamically optimizing viewing zones is disclosed herein. In one embodiment, by way of non-limiting example, a three-dimensional image display device may include: a display panel configured to display image information of at least two viewpoints; an optical substrate separately disposed from the display panel at a predetermined distance, the optical substrate being configured to form at least one intermediate viewing zone between left and right viewing zones included in base viewing zones corresponding to two viewpoints that are observed when a position of an observer moves horizontally; and a control unit configured to provide the image information corresponding to the respective viewpoints at the base viewing zones and remove image information in the at least one intermediate viewing zone.

In another embodiment, a three-dimensional image display device may include: a display panel configured to display image information of at least four viewpoints; an optical substrate separately disposed from the display panel at a predetermined distance, the optical substrate being configured to form at least one unit viewing zone between the main viewing zones and the sub viewing zones and form at least one unit viewing zone between the left and right viewing zones of the main viewing zones corresponding to respective pupils of both eyes; and a control unit configured to provide the image information corresponding to the respective viewpoints at left and right viewing zones of the main viewing zones and remove the image information form the at least one unit viewing zone between the main viewing zones and the sub viewing zones.

In yet another embodiment, a three-dimensional image display device may include: image display means configured to display image information of at least two viewpoints; and binocular disparity means disposed in front of the image display means, wherein the three-dimensional image display device is configured to form left and right viewing zones included in main viewing zones corresponding to both eyes by merging more than two unit viewing zones adjacent to each other.

This Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

This detailed description is provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 2:
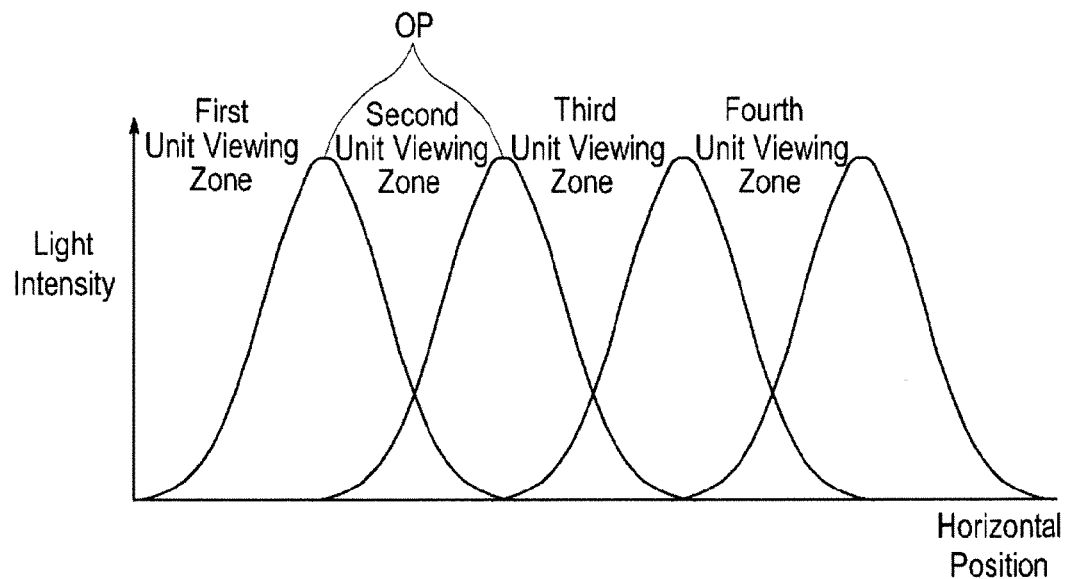
FIG. 2 is a schematic diagram showing an example of a light intensity distribution according to a viewing zone.
Figure 3A:
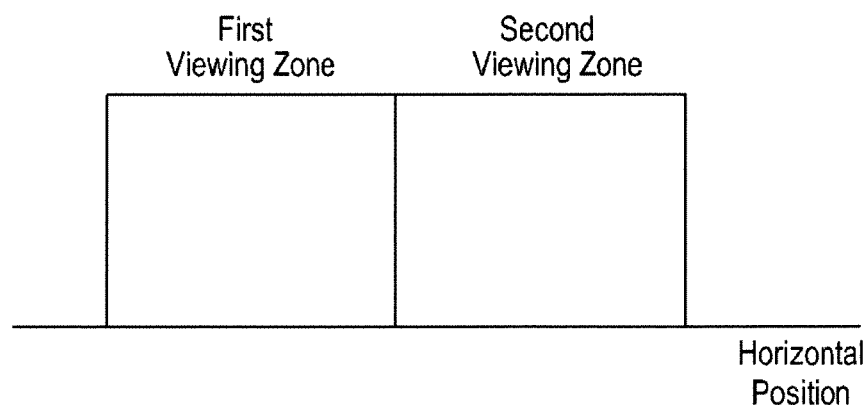
FIG. 3A is a schematic diagram showing an example of an ideal light intensity distribution according to a viewing zone.
Figure 3B:
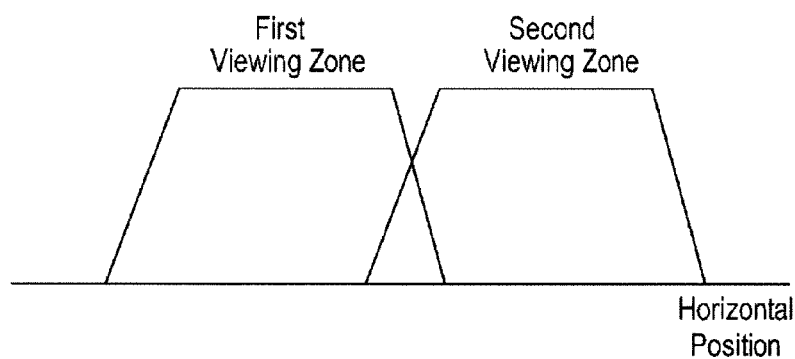
FIG. 3B is a schematic diagram showing an example of a light intensity distribution according to a viewing zone.

With a three-dimensional image display device using a parallax barrier and lenticular lens, a crosstalk effect occurs. Images for adjacent viewing zone are mixed according to an eye movement in the same viewing zone caused by the crosstalk. FIG. 2 is a schematic diagram showing an example of a light intensity distribution according to the viewing zones. If an observer's viewpoint gets out a little bit from an optimal observation point OP of the first and adjacent second unit viewing zones, then the crosstalk may occur. The crosstalk may occur between adjacent viewing zones among the second, third and fourth viewing zones. FIG. 3A is a schematic diagram showing an example of an ideal light intensity distribution according to a viewing zone. At the ideal light intensity distribution having no interference between the adjacent viewing zones, when an observer moves horizontally from the observation point, there is an abrupt change of the viewing zones. This is because a boundary between the first and adjacent second viewing zones is clear. Each of the viewing zones has uniform light intensity distribution. However, it is difficult to realize that the ideal viewing zones and an overlapping between the viewing zones may occur, as shown in FIG. 3B. It is possible to uniformly form the light intensity in each of the viewing zones.

Figure 4:
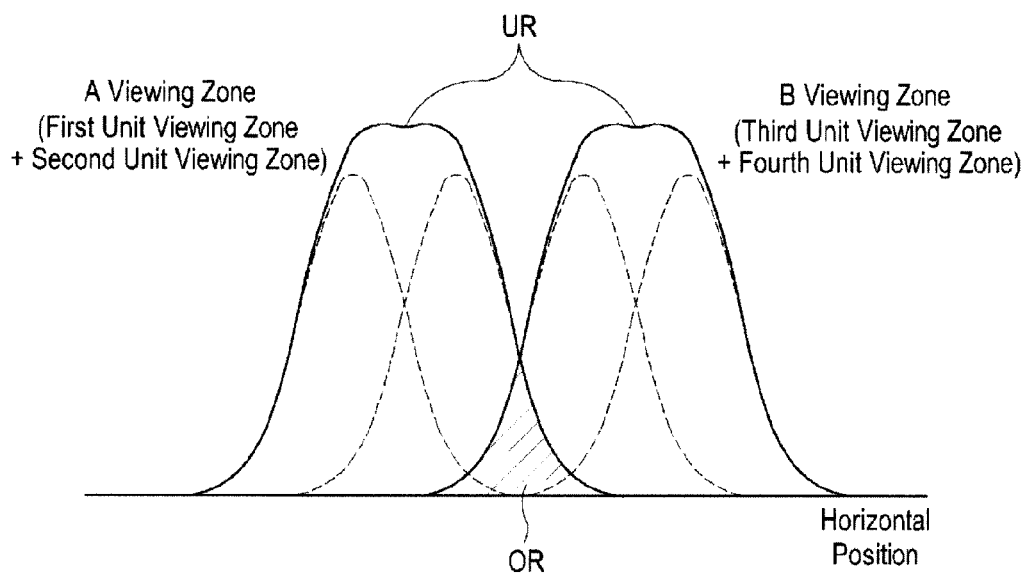
FIGS. 4 and 5 are schematic diagrams showing examples of an enlargement of viewing zones.

One purpose of the present invention is to enlarge a region having uniform light intensity representing images in one viewing zone and minimize an overlapping region between two viewing zones. In one embodiment, if an image signal process is performed to provide same image information at the adjacent two unit viewing zones, then it is possible to enlarge the region of the viewing zone UR having uniform light intensity and to relatively decrease an image overlapping region OR in which the crosstalk occurs, as shown in FIG. 4.

Figure 5:
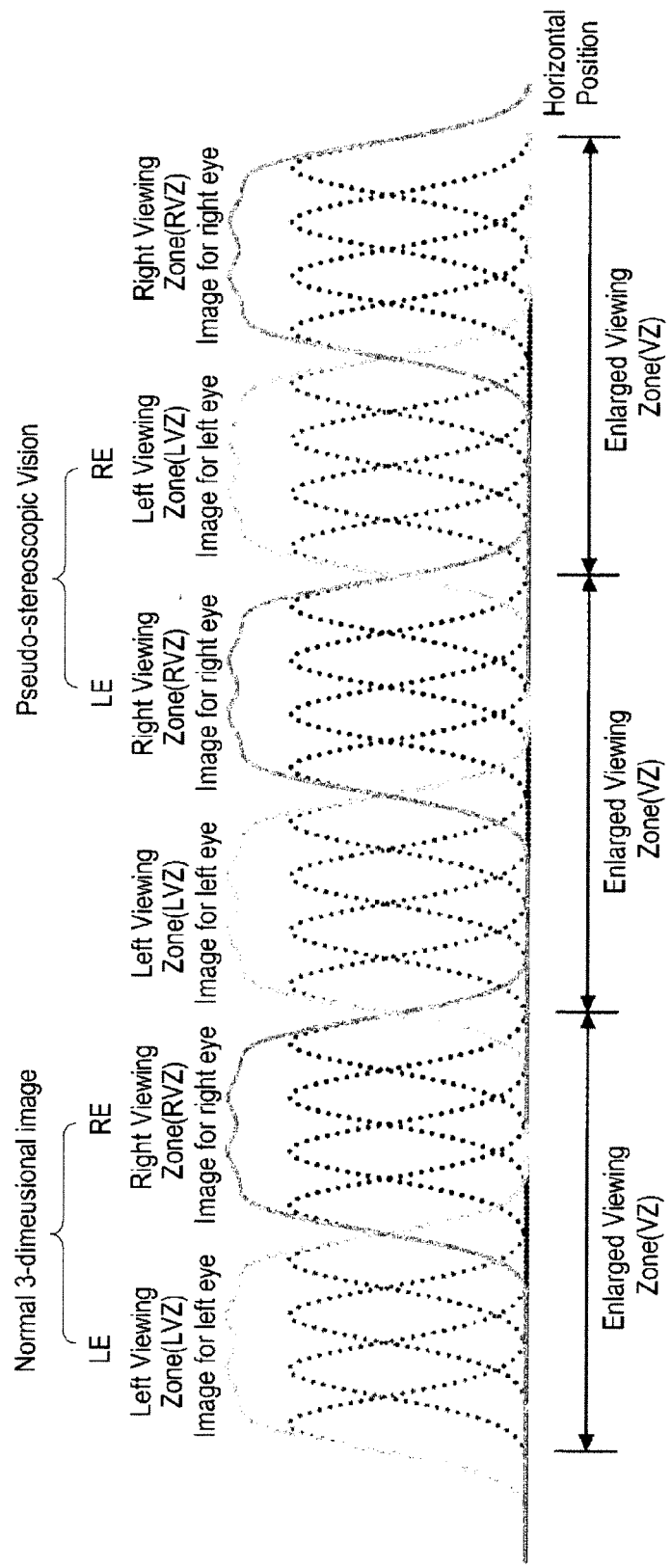

FIG. 5 is a schematic diagram showing an example of an enlargement of the viewing zones. Each viewing zone can be enlarged by merging at least two unit viewing zones among the unit viewing zones of FIG. 2. The enlarged viewing zone VZ includes left viewing zone LVZ displaying images for the left eye and right viewing zone RVZ displaying images for the right eye. The LVZ and RVZ are formed alternately. In the embodiment of FIG. 5, the LVZ or RVZ are formed by merging the four adjacent unit viewing zones. As shown in FIG. 5, a region having uniform images projected into each eye becomes wider and a region of the crosstalk representing an overlapping of adjacent image information is considerably decreased.

Even when widening the viewing zone of which an intensity change of the light representing the images is minimized, when the observer positioned at a specific observation point moves widely to a horizontal direction, the observer cannot help but observe a pseudo-stereoscopic vision. As to a specific viewing zone VZ, when the images for the left eye of the left viewing zone LVZ are projected into the left eye and the images for the right eye of the right viewing zone RVZ are projected into the right eye, the observer can observe a normal three-dimensional image. If a horizontal eye position of the observer gets out of a range of the specific viewing zone VZ, then the images for the left eye are projected into the right eye and the images for the right eye are projected into the left eye. This is so that the observer observes the pseudo-stereoscopic vision. The above case corresponds to a situation where a position of the observer's eyes is in a pseudo-stereoscopic vision range. To eliminate the pseudo-stereoscopic vision range, another purpose of the present invention is dynamically relocating viewpoint images of the viewing zones of each eye according to a movement of the observer's eye position identified in real time with maintaining a interval of the viewing zones to view a precise three-dimensional image without the pseudo-stereoscopic vision range.

Figure 6:
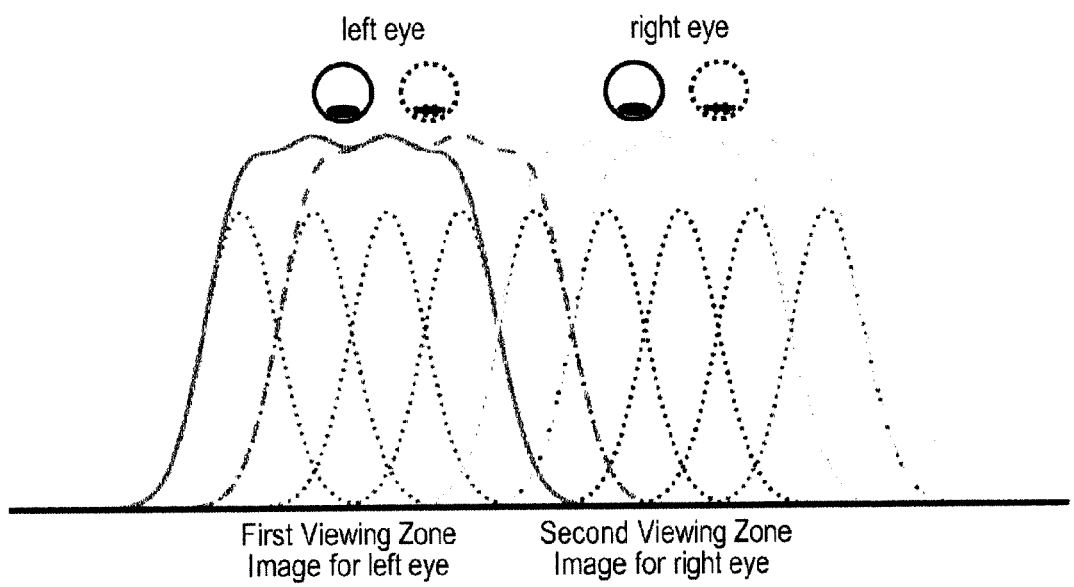
FIG. 6 is a schematic diagram showing an example of a three-dimensional image realization method.

FIG. 6 is a schematic diagram showing an example of a method that prevents an occurrence of the pseudo-stereoscopic vision range and further prevents the crosstalk between two viewing zones according to the movement of the observer. The first viewing zone LVZ and the second viewing zone RVZ drawn by real lines represent ranges for displaying the images for the left and right eyes. The LVZ and RVZ are formed by merging at least two unit viewing zones. In one embodiment of FIG. 6, the LVZ and RVZ are formed by merging four unit viewing zones. An initial position of the observer's left and right eyes is located in an intermediate part of each viewing zone. The observer's left and right eyes positioned at the initial position is drawn by the real line. When the observer's eyes move from the initial position to a new position marked by a dotted line and an initial position of the first and second viewing zones is fixed, the crosstalk (i.e., overlap of between viewing zones) may occur. The present invention may identify a moving direction of the observer's eyes and then synchronize the image information of the unit viewing zones included in the left and right viewing zones with the moving direction of the observer's eyes to be positioned at the intermediate part of each viewing zone, even though the observer's eyes move. This helps to prohibit an occurrence of the pseudo-stereoscopic vision range, minimize the crosstalk and form the three-dimensional image through consecutive motion parallax and brightness change minimized viewing zones. Although a pupil tracking system using a position tracking sensor is used at a conventional three-dimensional image display device, since each viewing zone of the present invention is formed by merging at least two unit viewing zones, a natural three-dimensional can be formed by changing the image information of unit viewing zones adjacent to each viewing zone from the image information for the left/right eyes to the image information for the right/left eyes according to the eye's movement. If parallax images of each eye are considered in real time based on tracking information according to the eye's movement, then the consecutive motion parallax can be realized without any abrupt change of the parallax change.

Figure 7:
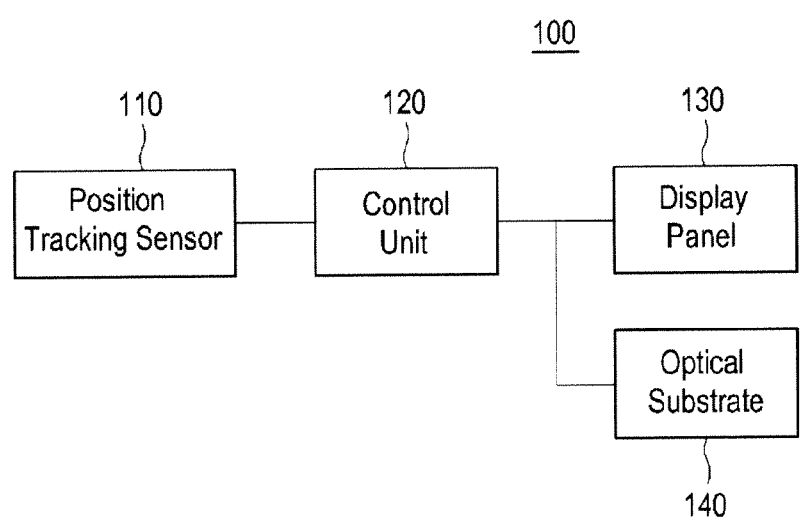
FIG. 7 is a block diagram showing an example of a three-dimensional image display device.

FIG. 7 is a block diagram showing an example of the three-dimensional image display device. The three-dimensional image display device 100 may include a position tracking sensor 110, a control unit 120, a display panel 130 and an optical substrate 140.

The position tracking sensor 110 may form position information by periodically identifying positions of the observer's pupil, eyeball, face or the like.

The control unit 120 may relocate the left and right viewing zones according to the position of the observer's eyes based on the position information and control the display panel 130 to provide the image information at each viewing zone. The control unit 120 may control the position tracking sensor 110, the display panel 130 and the optical substrate 140.

Figure 1:
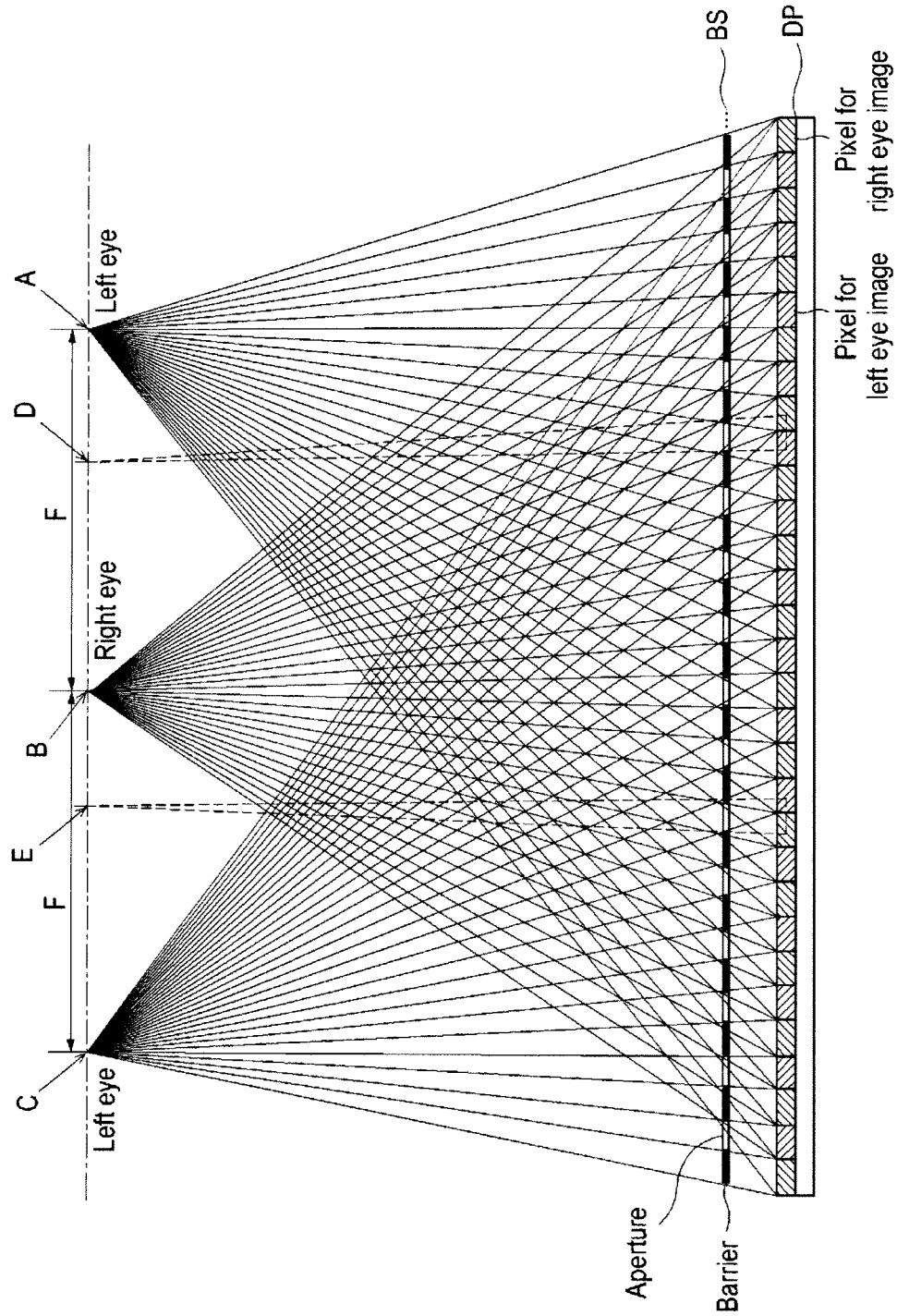
FIG. 1 is a schematic diagram showing an example of a three-dimensional display apparatus.

The display panel 130 may include a variety of pixels and display the light having a specific intensity at each pixel based on controlling the control unit 120. As shown in FIG. 1, the images for the left and right eyes are displayed at the pixels included in the display panel 130 to a horizontal direction alternately.

The optical substrate 140 may alternately and separately form the images for the left and right eyes to observe the three-dimensional image at a proper observation distance. The optical substrate 140 may include a parallax barrier, an optical substrate having lenticular lenses periodically arranged thereon or an optical substrate having micro lenses periodically arranged thereon.

The three-dimensional image display device 100 according to the present invention and a concrete example using a conception of the present invention having the multi-viewpoints structure are described below. As to the three-dimensional image display device 100, the left viewing zone for displaying the images for the left eye and the right viewing zone for displaying the images for the right eye are formed corresponding to both eyes of the observer at an intermediate point of the three-dimensional image display device 100. The left and right viewing zones are alternately and separately formed at a predetermined distance. A pair of left and right viewing zones formed at the intermediate point of the three-dimensional image display device 100 is referred to as main viewing zones, while pairs of left and right viewing zones (except for main viewing zones) are referred to as sub viewing zones. In one embodiment, the three-dimensional image display device 100 forms more than four unit viewing zones at the main viewing zones to eliminate the crosstalk caused by overlapping between the viewing zones. At the three-dimensional image display device 100 forming more than four unit viewing zones at the main viewing zones, two viewpoints positioned at a relevant position of the observer's eyes are defined as base viewpoints. Two viewing zones relevant to the base viewpoints are defined as base viewing zones. To add at least one viewpoint between the left and right viewing zones formed at the relevant position of the observer's eyes, between the main and sub viewing zones and between the adjacent sub viewing zones, a maximum value of an interval of the viewing zones is set as a half of an interval of both eyes.

The control unit 120 of the three-dimensional image display device 100 forming more than four unit viewing zones removes image information of at least one of a viewpoint formed between the viewpoints positioned at a relevant position of the observer's eyes and a viewpoint positioned between the main and sub viewing zones by using the position information formed at the position tracking sensor 110. This is to get rid of the crosstalk. The control unit 120 provides image information at the viewing zones except for the image information removed viewing zones to widen a range at which the observer can observe a normal three-dimensional image. The provided image information is the same as the image information of the viewing zone relevant to an adjacent pupil position. Although the viewpoints move, the observer can view the three-dimensional image without distortion. When there are more than three unit viewing zones providing the same image information, a brightness difference between the viewing zones relevant to both eyes can be reduced by controlling brightness of the image information provided at each unit viewing zone.

Figure 8:
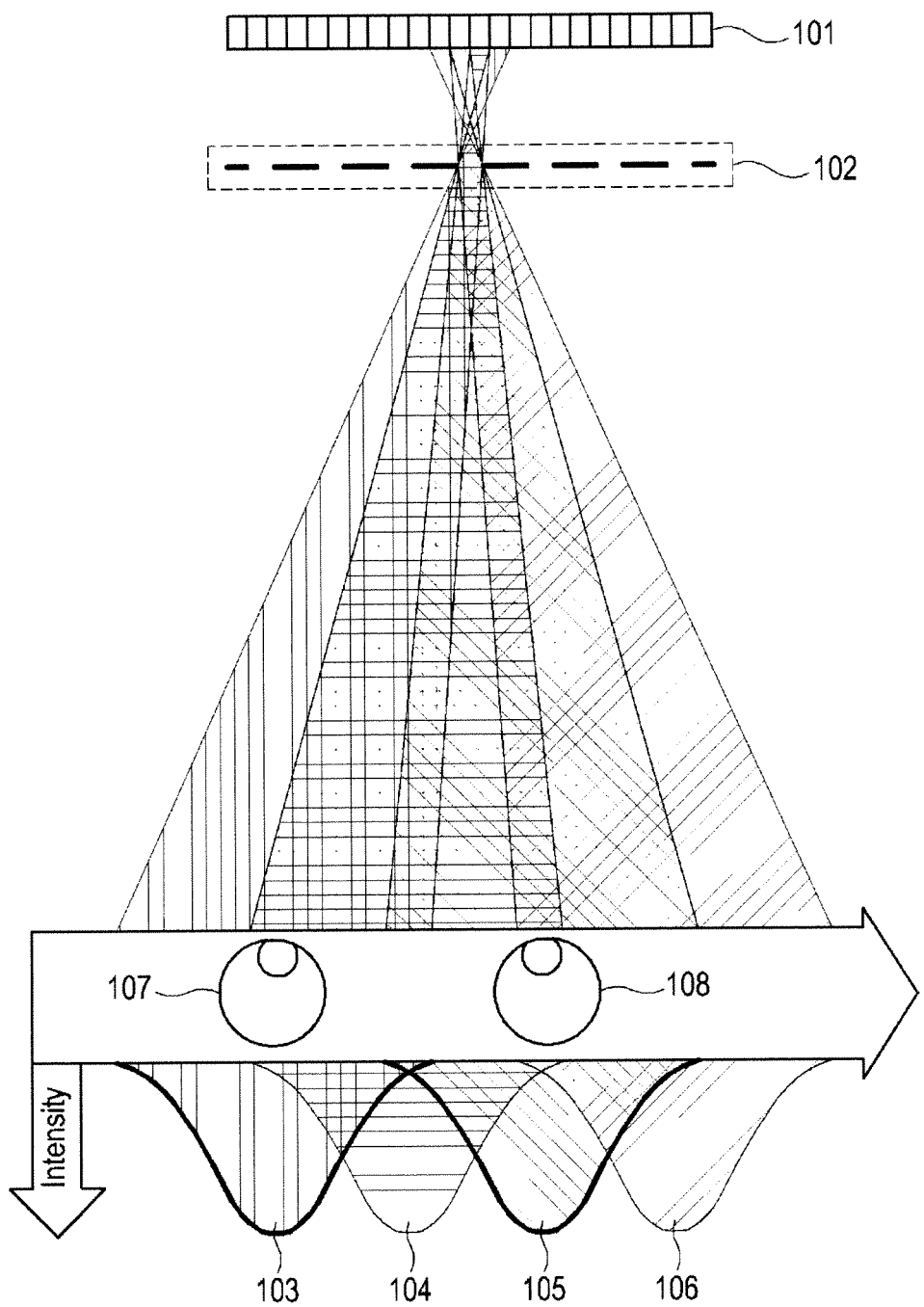
FIG. 8 is a schematic diagram showing an example of a three-dimensional display apparatus including four unit viewing zones.

FIG. 8 is a schematic diagram showing an example of a three-dimensional image display device including four unit viewing zones. The display panel 101 may be a normal RGB sub-pixel arrayed flat display panel. Reference numeral 102 may represent a parallax barrier as one embodiment of the optical substrate for forming a parallax image. However, the optical substrate 102 is not limited thereto and may include various types of means for forming the parallax image. The light that comes out from the display panel 101 may pass through the optical substrate 102 and form the viewpoints having a certain width apart from the optical substrate 102 at the observer's position. In one embodiment of FIG. 8, a unit viewing zone 104 is additionally formed between the two base viewing zones 103, 105 relevant to the position of the pupils of both eyes 107, 108 based on the average distance of both eyes and another unit viewing zone 106 is further formed between the main viewing zones 103, 105 and the sub viewing zones (not shown). The control unit 120 removes the image information of the unit viewing zone 104 positioned between the two base viewing zones 103, 105 and the unit viewing zone 106 positioned between the main viewing zones 103, 105 and the sub viewing zones by controlling the display panel 130 to reduce the crosstalk. This embodiment may be realized when the three-dimensional image display device 100 has more than four viewing zones.

Figure 9:
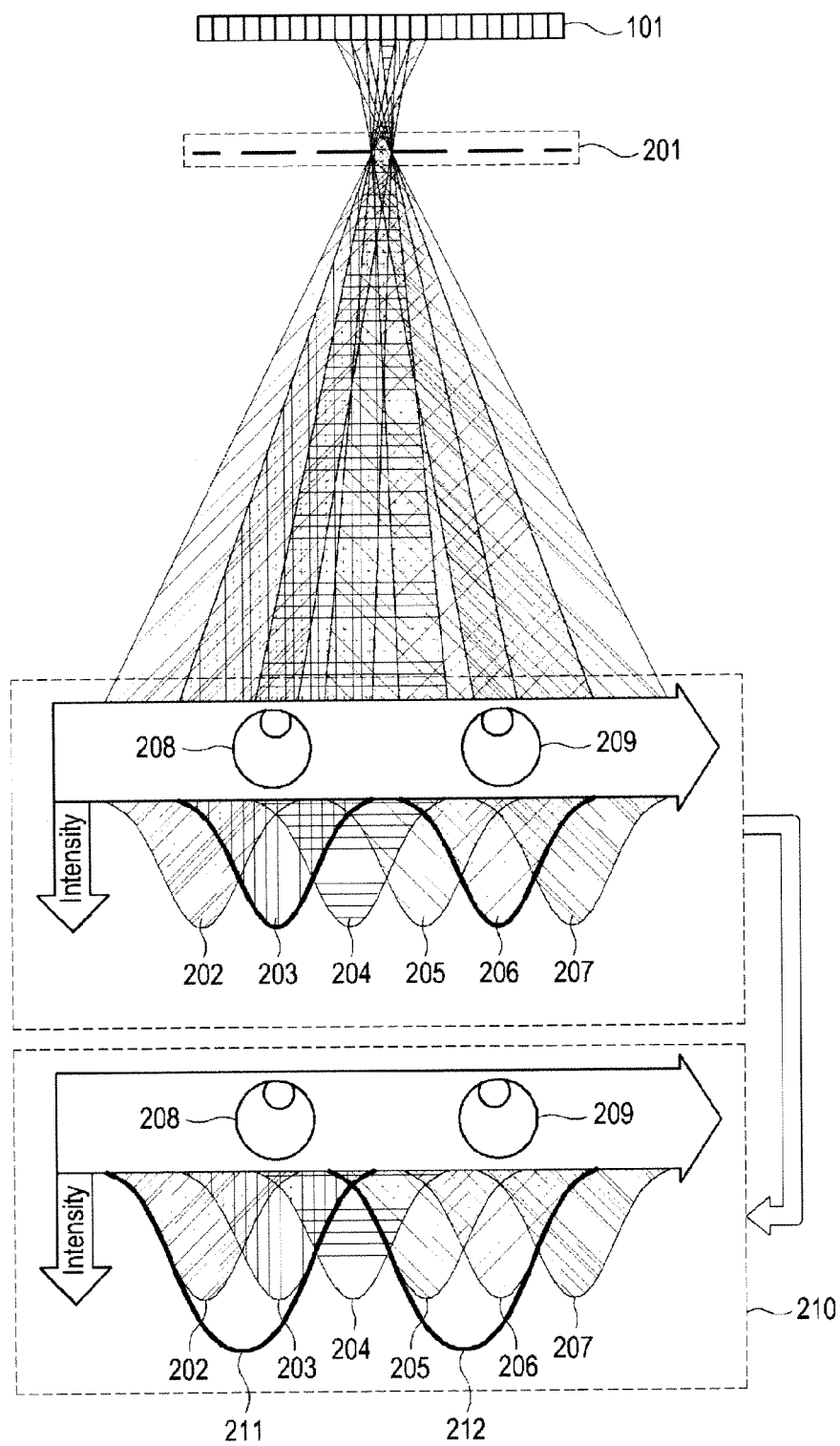
FIGS. 9 to 11 are schematic diagrams showing examples of three-dimensional display apparatuses having at least one unit viewing zone between left and right eyes.

FIG. 9 is a schematic diagram showing an example of three-dimensional image display device having a decreased interval between the unit viewing zones. Reference numeral 201 may represent a parallax barrier as one embodiment of the optical substrate for forming a parallax image having a decreased interval between the unit viewing zones. The interval between each of the unit viewing zones 202-207 is designed to be one third of the average interval between the pupils. However, the interval between each of the unit viewing zones 202-207 is certainly not limited thereto. The brightness distribution of the light formed at the display panel 101 and passing through the optical substrate 201 according to each unit viewing zone may be depicted as 202-207. In one embodiment, the crosstalk is reduced by removing image information of the unit viewing zones 202, 204, 205, 207 except for the left and right viewing zones of the base viewing zones 203, 206 relevant to the position of the pupils of both eyes 208, 209. In another embodiment, referring to reference numeral 210, if the image information of the unit viewing zones 202, 205 is the same as the image information of the left and right viewing zones of the base viewing zones 203, 206 relevant to the adjacent pupil position 208, 209, then the width and brightness of the viewing zone at which the observer can observe the image may be increased, as shown in 211 and 212. The crosstalk is reduced by removing the image information of the unit viewing zone 204 between the left and right viewing zones of the main viewing zones 211, 212 and the unit viewing zone 207 between the main viewing zones 211, 212 and the sub viewing zones (not shown) by controlling the display panel 130 to reduce the crosstalk.

Figure 10:
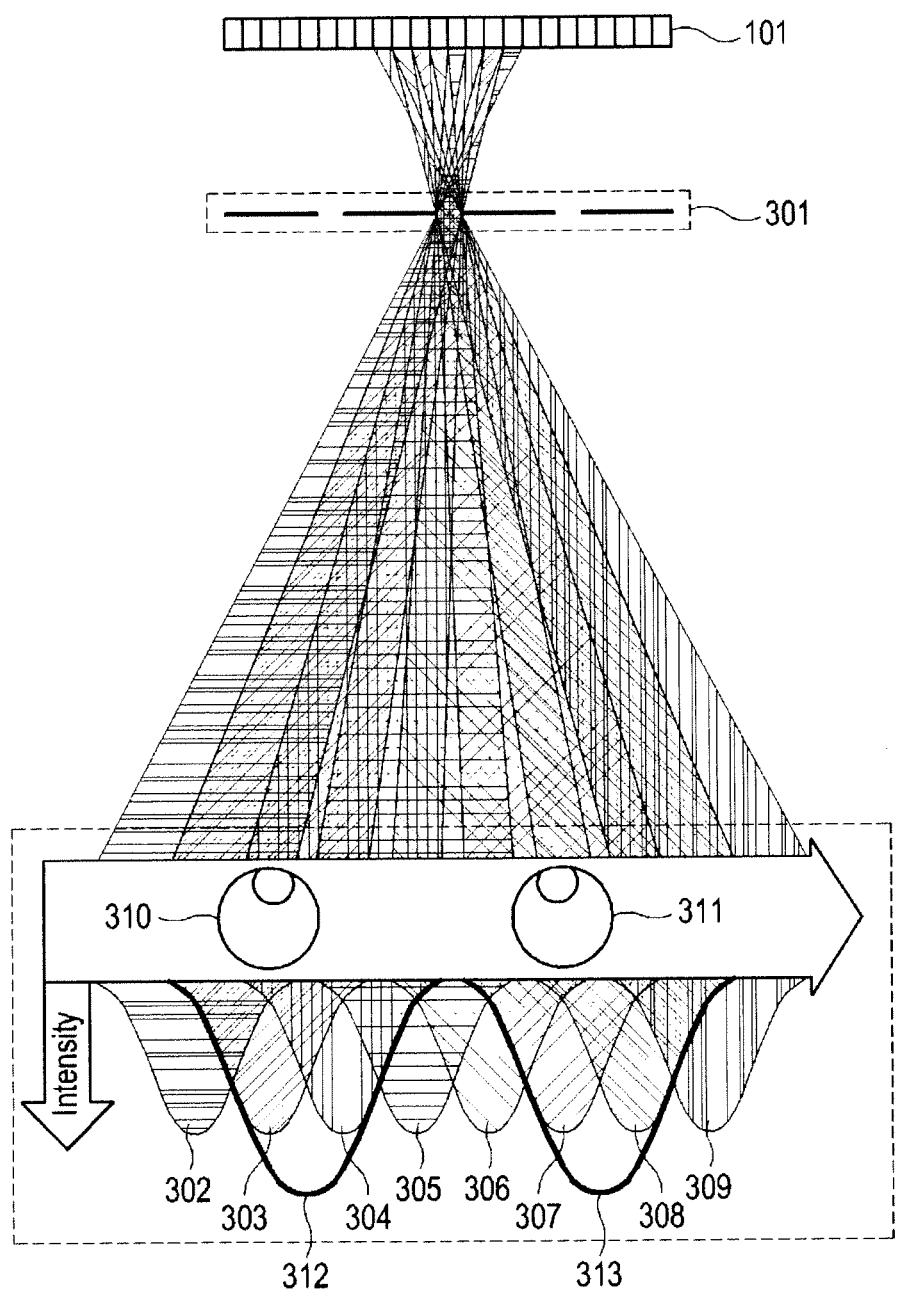

FIG. 10 is a schematic diagram showing an example of a three-dimensional image display device having a decreased interval between the unit viewing zones. Reference numeral 301 may represent a parallax barrier as one embodiment of the optical substrate for forming a parallax image having a decreased interval between the unit viewing zones. The interval between each of the unit viewing zones 302-309 is designed to be one fourth of the average interval between the pupils. However, the interval between each of the unit viewing zones 302-309 is certainly not limited thereto. The brightness distribution of the light formed at the display panel 101 and passing through the optical substrate 301 according to each unit viewing zone may be depicted as 302-309. In one embodiment, the crosstalk is reduced by removing image information of the unit viewing zones 302, 304, 305, 306, 308, 309 except for the base viewing zones 303, 307 relevant to the position of the pupils of both eyes 310, 311. In another embodiment, if the image information of the unit viewing zones 304, 308 is the same as the image information of the left and right viewing zones of the base viewing zones 303, 307 relevant to the adjacent pupil position 310, 311, then the width and brightness of the main viewing zones at which the observer can observe the image may be increased, as shown in 312 and 313. Also, the crosstalk may be reduced by removing the image information of the unit viewing zones 302, 305, 306, 309 except for the main viewing zones 312, 313. The brightness of the width and brightness increased main viewing zones 312, 313 is randomly controllable.

Figure 11:
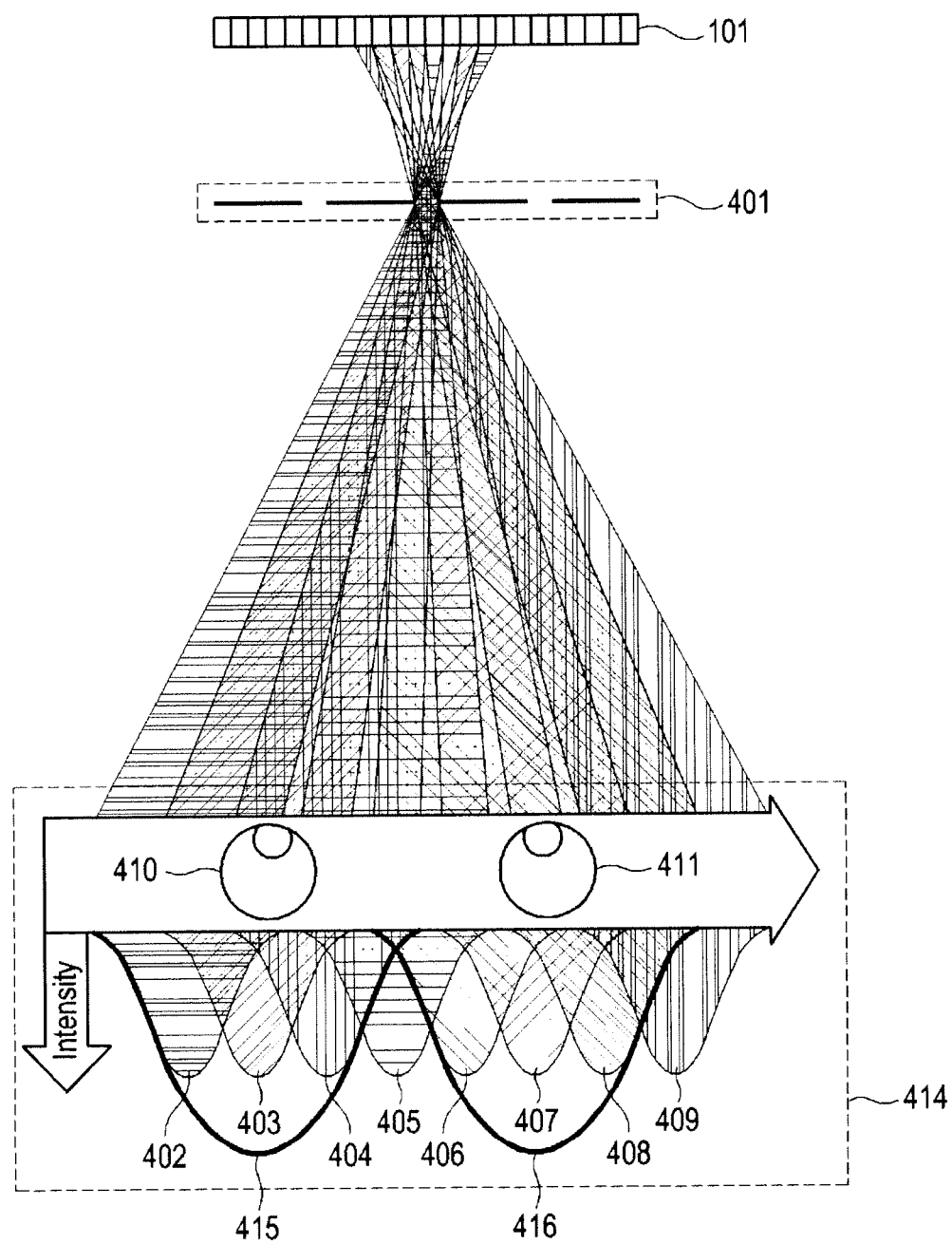

FIG. 11 is a schematic diagram showing an example of a three-dimensional image display device having a decreased interval between the unit viewing zones and further showing a modified example of FIG. 10. Reference numeral 401 may represent a parallax barrier as one embodiment of the optical substrate for forming a parallax image having a decreased interval between the unit viewing zones. The brightness distribution of the light formed at the display panel 101 and passing through the optical substrate 301 according to each unit viewing zone may be depicted as 402-409. As discussed above, the crosstalk is reduced by removing image information of the unit viewing zones 402, 404, 405, 406, 408 except for the left and right viewing zones of the base viewing zones 403, 407. In another modified embodiment, if the image information of the unit viewing zones 402, 404, 406, 408 adjacent to the base viewing zones 403, 407 is the same as the image information of the base viewing zones 403, 407 relevant to the adjacent pupil position 410, 411, then the width and brightness of the main viewing zones at which the observer can observe the image may be increased, as shown in 415 and 416. Further, the crosstalk may be reduced by removing the image information of the unit viewing zones 405, 409 except for the main viewing zones 415, 416.

Figure 12:
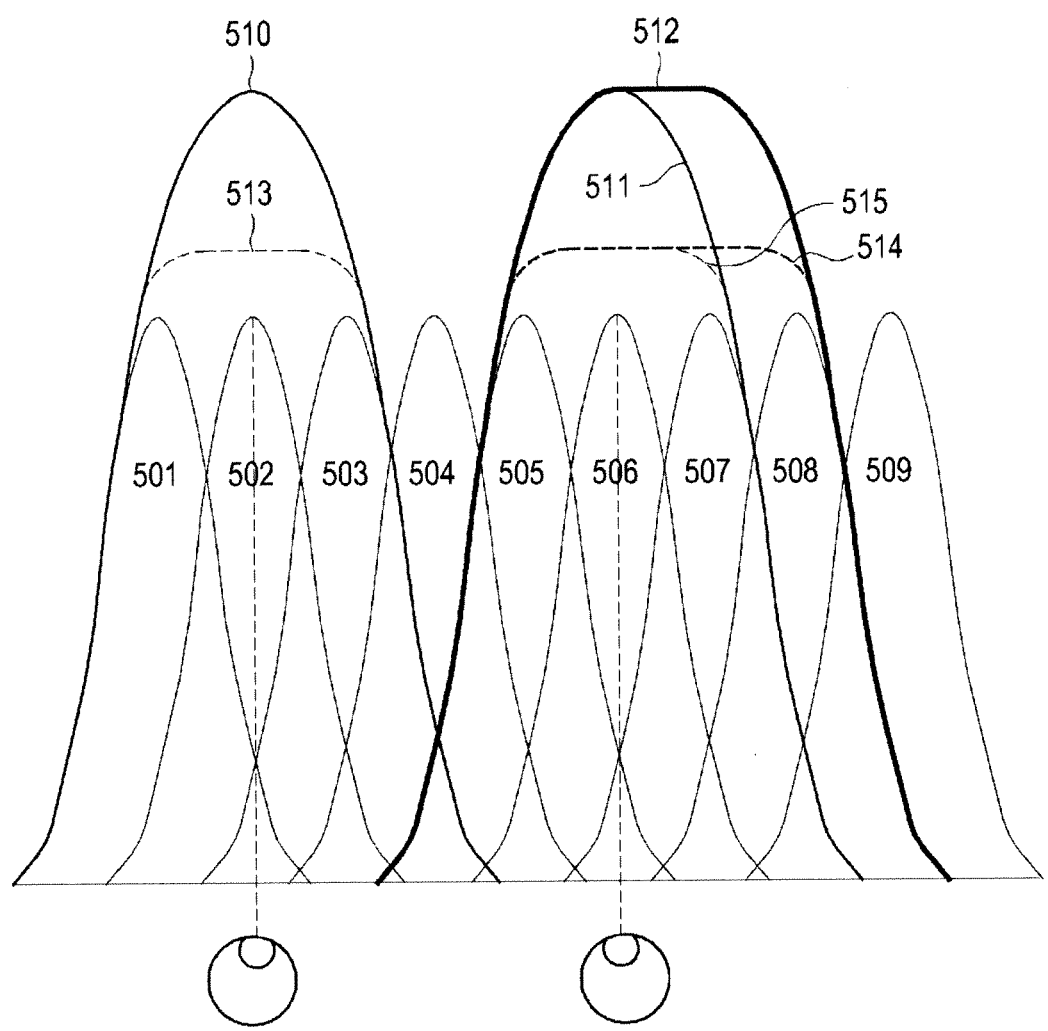
FIG. 12 is a schematic diagram showing an example of a brightness distribution according to viewing zones.

In the embodiments of FIG. 8-11, the width and brightness of the viewing zone can be increased. In case the number of unit viewing zones formed at the three-dimensional image display device is an even number, the crosstalk may be lessened by removing the image information of at least one unit viewing zone relevant to the position of the pupils of both eyes and at least one unit viewing zone between the main and sub viewing zones. Further, it can be lessened by providing the same image information at the viewing zones relevant to the adjacent pupil position except for the at least one unit viewing zone relevant to the position of the pupils of both eyes and the at least one unit viewing zone between the main and sub viewing zones FIG. 12 is a schematic diagram showing an example of a brightness distribution according to the viewing zones when the number of unit viewing zones is an odd number. The brightness distribution of nine unit viewing zones may be depicted as 501-509. In one embodiment, the crosstalk is lessened by removing image information of the unit viewing zones 501, 503, 504, 505, 507, 508, 509 except for the left and right eyes of the base viewing zones 502, 506 relevant to the position of the pupil of both eyes. According to another embodiment, if the image information of the unit viewing zones 501, 503, 505, 507 adjacent to the base viewing zones 502, 506 is the same as the image information of the base viewing zones 502, 506 relevant to the adjacent pupil position, the width and brightness of the main viewing zones at which the observer can observe the image may be increased, as shown in 510 and 511. The crosstalk is reduced by removing the image information of the unit viewing zone 504 positioned at the intermediate of the left and right viewing zones of the main viewing zones 510, 511 and two unit viewing zones 508, 509 positioned between the main viewing zones 510, 511 and the sub viewing zones (not shown).

In another modified embodiment, if the image information of the unit viewing zones 501, 503 adjacent to the left viewing zone 502 of the base viewing zones and the unit viewing zones 505, 507, 508 adjacent to the right viewing zone of the base viewing zones 506 is the same as the image information of each of the base viewing zones 502, 506 relevant to the adjacent pupil position, then the width and brightness of the main viewing zones at which the observer can observe the image may be increased, as shown in 510 and 512. Furthermore, the crosstalk is reduced by removing the image information of the unit viewing zone 504 positioned at the intermediate of the left and right viewing zones of the main viewing zones 510, 512 and the unit viewing zone 509 positioned between the main viewing zones 510, 512 and the sub viewing zones (not shown). In case the main viewing zones are reference numerals 510, 512, a sense of fatigue of the observer may be increased due to a brightness distribution difference between the left and right eyes. Thus, it may be possible to reduce the repulsion of the observer by decreasing the brightness distribution, as shown in numeral references 513 and 514, by controlling the brightness of the viewing zones using the same three-dimensional image information. The repulsion of the observer by the brightness distribution difference of the viewing zones is not caused by the difference between the number of viewing zones using the same image information for the left and right eyes. Since the repulsion of the observer is caused by using the same image information at more than three unit viewing zones, even in case the main viewing zones are reference numerals 510, 511, the repulsion of the observer caused by the brightness distribution difference may be lessened similar to reference numerals 513 and 515 by controlling the brightness of the viewing zones. This can be applied when the number of unit viewing zones using the same image information is an even number.

Any reference in this specification to "one embodiment," "an embodiment," "example embodiment," "illustrative embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A three-dimensional image display device, comprising;
    a display panel configured to display image information of at least two viewpoints;
    an optical substrate separately disposed from the display panel at a predetermined distance, the optical substrate being configured to form at least one intermediate viewing zone between left and right viewing zones included in base viewing zones corresponding to the at least two viewpoints that are observed when a position of an observer moves horizontally; and
    a control unit configured to provide the image information corresponding to the respective viewpoints at the base viewing zones and remove the image information in the at least one intermediate viewing zone, wherein
    each of the left and right viewing zones is formed by merged viewing zones including at least two unit viewing zones, and the at least two unit viewing zones of each of the left and right viewing zones are controlled to include same image information; and
    a number of the unit viewing zones of the left viewing zone is identical with that of the right viewing zone.

2. The three-dimensional image display device of claim 1, wherein the control unit controls brightness of the image information of the unit viewing zones included in the left and right viewing zones of the base viewing zones to uniformize brightness distribution of the left and right viewing zones.

3. The three-dimensional image display device of claim 1, wherein the optical substrate includes at least one of a parallax barrier having barriers and apertures alternately, and wherein an optical substrate having lenticular lenses is periodically arranged thereon and an optical substrate having micro lenses is periodically arranged thereon.

4. The three-dimensional image display device of claim 1, further comprising; a position tracking sensor configured to form position information by identifying the observer's position.

5. The three-dimensional image display device of claim 4, wherein the control unit relocates the left and right viewing zones of the base viewing zones according to the moved position of the observer by using the position information.

6. The three-dimensional image display device of claim 5, wherein the relocation of the left and right viewing zones is performed by changing the image information provided at the unit viewing zones included in the left and right viewing zones by using the position information.

7. A three-dimensional image display device including an optical substrate for forming main viewing zones and sub viewing zones, comprising;
    a display panel configured to display image information of at least four viewpoints;
    an optical substrate separately disposed from the display panel at a predetermined distance, the optical substrate being configured to form at least one first intermediate viewing zone between the main viewing zones and the sub viewing zones and form at least one second intermediate viewing zone between left and right viewing zones of the main viewing zones corresponding to respective pupils of both eyes; and
    a control unit configured to provide the image information corresponding to the respective viewpoints at the left and right viewing zones and remove the image information from the at least one first and second intermediate viewing zones, wherein
    each of the left and right viewing zones is formed by merged viewing zones including at least two unit viewing zones, and the at least two unit viewing zones of each of the left and right viewing zones are controlled to include same image information; and
    a number of the unit viewing zones of the left viewing zone is identical with that of the right viewing zone.

8. The three-dimensional image display device of claim 7, wherein the control unit controls brightness of the image information of the unit viewing zones included in the left and right viewing zones of the main viewing zones to uniformize brightness distribution of the left and right viewing zones.

9. The three-dimensional image display device of claim 7, wherein the optical substrate includes at least one of a parallax barrier having barriers and apertures alternately, and wherein an optical substrate having lenticular lenses is periodically arranged thereon and an optical substrate having micro lenses is periodically arranged thereon.

10. The three-dimensional image display device of claim 7, further comprising; a position tracking sensor configured to form position information by identifying the observer's position.

11. The three-dimensional image display device of claim 10, wherein the control unit relocates the left and right viewing zones of the main viewing zones according to the moved position of the observer by using the position information.

12. The three-dimensional image display device of claim 11, wherein the relocation of the main viewing zones is performed by changing the image information provided at the unit viewing zones included in the left and right viewing zones of the main viewing zones by using the position information.

13. A three-dimensional image display device, comprising; image display means configured to display image information of at least two viewpoints; and binocular disparity means disposed in front of the image display means,
  wherein the three-dimensional image display device is configured to form left and right viewing zones included in main viewing zones corresponding to both eyes, wherein
  each of the left and right viewing zones is formed by merged viewing zones including at least two unit viewing zones, and the at least two unit viewing zones of each of the left and right viewing zones are controlled to include the same image information; and
  a number of the unit viewing zones of the left viewing zone is identical with that of the right viewing zone.

14. The three-dimensional image display device of claim 13, wherein the binocular disparity means includes at least one of a parallax barrier having barriers and apertures alternately, and wherein an optical substrate having lenticular lenses is periodically arranged thereon and an optical substrate having micro lenses is periodically arranged thereon.

15. The three-dimensional image display device of claim 13, wherein the three-dimensional image display device has at least one immediate viewing zone between the left and right viewing zones, and wherein the image information of the at least one immediate viewing zone is removed.

16. The three-dimensional image display device of claim 13, further comprising; a position tracking sensor configured to form position information by identifying an observer's position.

17. The three-dimensional image display device of claim 16, wherein the control unit relocates the main viewing zones according to a change in the position of the observer by using the position information.

18. The three-dimensional image display device of claim 17, wherein the relocation of the main viewing zones is performed by changing the image information provided at the unit viewing zones included in the left and right viewing zones of the main viewing zones by using the position information.

19. The three-dimensional image display device of claim 1, wherein the image information in the at least one intermediate viewing zone is removed regardless of a position of the observer.

* * * * *